(12) United States Patent
Dupont

(10) Patent No.: US 6,724,781 B1
(45) Date of Patent: Apr. 20, 2004

(54) SYSTEM AND METHOD FOR PACKET TRANSPORT IN A RING NETWORK

(75) Inventor: Jean-Lou Dupont, Montreal (CA)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/378,844

(22) Filed: Aug. 23, 1999

(51) Int. Cl.⁷ .................................. H04J 3/04
(52) U.S. Cl. .................. 370/535; 370/390; 370/404
(58) Field of Search ................... 370/216, 218, 370/224, 252, 403, 404, 405, 406, 535, 539, 541, 227, 396, 536, 544, 217, 221, 400, 395, 394, 465, 468, 537, 538, 540, 542, 474, 475, 473, 390

(56) References Cited

U.S. PATENT DOCUMENTS

| | | | |
|---|---|---|---|
| 4,646,286 A | | 2/1987 | Reid et al. |
| 4,837,760 A | | 6/1989 | Reid et al. |
| 5,029,158 A | | 7/1991 | Reid et al. |
| 5,572,513 A | | 11/1996 | Yamamoto et al. |
| 5,754,528 A | | 5/1998 | Uchida |
| 5,757,774 A | | 5/1998 | Oka |
| 5,790,520 A | | 8/1998 | Iwamoto et al. |
| 5,793,745 A | | 8/1998 | Manchester |
| 5,838,724 A | | 11/1998 | Cole et al. |
| 5,867,502 A | * | 2/1999 | Chang .................. 370/401 |
| 5,872,780 A | | 2/1999 | Demiray et al. |
| 5,884,297 A | * | 3/1999 | Noven .................. 370/395.3 |
| 5,920,412 A | * | 7/1999 | Chang .................. 359/123 |
| 5,986,783 A | * | 11/1999 | Sharma et al. .......... 359/110 |
| 6,009,075 A | * | 12/1999 | Roberts et al. ......... 370/219 |
| 6,198,754 B1 | * | 3/2001 | Nakayama ............. 370/536 |
| 6,256,292 B1 | * | 7/2001 | Ellis et al. ............ 370/227 |
| 6,314,097 B1 | * | 11/2001 | Ohara ................. 370/392 |

FOREIGN PATENT DOCUMENTS

EP 0924952 6/1999

OTHER PUBLICATIONS

Parente, Victor R., America Online "Packet Over Sonet—Ringing Up Speed—POS Shunts LAN Traffic onto the WAN a Whole Lot Faster than ATM", Mar. 1998, pp. 86–92, Data Communications, US, McGraw Hill, New York.
Kajiyama, Yoshio, et al., "ATM Self–Healing Ring", Jun. 12, 1992, pp. 639–643, NTT transmission Systems Laboratories 1–2356, Take, Yokosuka–shi, Kanagawa–ken, 238–03, Japan.

* cited by examiner

Primary Examiner—Dang Ton
Assistant Examiner—Phuc Tran
(74) Attorney, Agent, or Firm—Jones Day

(57) ABSTRACT

A system and method for transporting data packets in a ring network includes a plurality of network nodes having a protection switching agent and at least one fast downstream path circuit that provides a low-latency packet cut-through function for forwarding packets from an upstream node to a downstream node. The network nodes include three interfaces, two interfaces for coupling the network node to other network nodes in the ring network, and a third interface for coupling the network node to a local node. A plurality of virtual paths are provided between a data packet gateway, such as an Internet gateway, and the local nodes that are coupled to the network nodes of the ring network. A virtual channel identifier is embedded within data packets transported on the network so that the protection switching agent in each network node can determine whether to route received data packets to the local node, or to the low-latency cut-through downstream path circuit.

16 Claims, 9 Drawing Sheets

SYSTEM AND METHOD FOR PACKET TRANSPORT IN A RING NETWORK

BACKGROUND OF THE INVENTION

1. Technical Field of the Invention

The present invention is directed to the field of data communication networks. More specifically, the invention provides a system and method for packet data transport in a ring network that is particularly well-suited for transporting asymmetrical data flows from a common point source coupled to the ring network, such as an Internet gateway connection, to a plurality of downstream local nodes. In such a configuration, the vast majority of data packets flow from the Internet gateway connection to the local nodes, and only a minor number of data packets flow back from the local nodes to the Internet gateway connection.

2. Description of the Related Art

Ring networks are well known in the data communication art. Typical ring systems include Fiber Distributed Digital Interface ("FDDI") rings, token-ring structures, and more recently Synchronous Optical Network ("SONET") rings. A ring network typically includes a plurality of network nodes coupled together by one or more data communication channels (or paths). These network nodes may, in turn, couple to local nodes or networks, or may couple to other ring structures.

In a SONET network, the network nodes can be logically connected by a plurality of virtual paths that coexist on the one or more physical network connections that couple the nodes. Each virtual path may include a plurality of virtual channels, wherein each virtual channel transports packets (or cells) that are formatted according to the SONET standard format, which is known as the Synchronous Payload Envelope ("SPE"). A SONET system incorporating virtual paths and virtual channels between the network nodes is disclosed in commonly-assigned U.S. patent application Ser. No. (S/N) 09/324,244, the disclosure of which is hereby incorporated into this application by reference. The SPE further defines the data cells as overhead and payload sections. Overhead information is used to maintain the operation and maintenance of the network, whereas payload information represents the deliverable information of the system being transported in the particular virtual channel. The physical network connection spanning the network nodes may include one or more fiber optic connections. In some network topologies, a single fiber carries payload information in both directions around the ring, whereas in others there is one fiber for one sense of direction, and another fiber for the other sense of direction. In a SONET ring network these two senses of direction are typically referred to as the east and west directions of the ring.

One important concept in ring network design is path protection switching. Path protection switching involves sensing when a fault has occured on the ring network and routing data traffic to accomodate the faulty connection. In some ring systems, a separate path protection channel or connection is provided so that if the main data path is severed (or otherwise inoperative), the system switches traffic onto the protection channel. However, these systems require a separate physical channel between the network nodes, as well as additional hardware to support the path protection channel. Moreover, if the path protection channel (or connection) is physically routed in proximity to the main connection between the nodes (as is common), then a fault (such as a fiber cut of the main connection from a back-hoe or other heavy machinery) will likely result in the path protection channel being faulty as well. A unique "transmitter-based" path protection switching system and method are disclosed in commonly-assigned U.S. patent application Ser. No. 09/324,244, the disclosure of which has been incorporated into this application by reference.

Another important concept in ring network design has emerged recently, and relates primarily, but not exclusively, to the problem of transporting Internet-type data between a plurality of users and a common Internet gateway access node. In a SONET ring network, a plurality of point-to-point connections are typically supported between the network nodes in the ring. These dedicated, point-to-point connections typically provide a great deal of bandwidth. However, one problem with using these types of point-to-point connections for Internet data relates to the fact that with the exception of certain high-traffic periods of time, much of the bandwidth dedicated to the point-to-point connection is wasted.

Another problem with routing Internet-type data over a ring network comprising a plurality of intermediate network nodes is latency, particularly downstream latency. Downstream latency is a term that describes the amount of time it takes to communicate data packets from a common gateway connection point, such as an Internet gateway, to the local nodes (i.e., customers) that are coupled to the network nodes of the ring network. Upstream latency is a term that relates to time delay in the other direction, i.e., from the local nodes to the gateway. Downstream latency is a particularly important issue for Internet applications because of the inherent asymmetry of the data flow. Because most Internet-type applications are heavily skewed towards downloading information, as opposed to uploading, it is particularly important to minimize the downstream latency through the network nodes.

One presently known attempt at transporting data packets over a ring network is ATM (Asynchronous Transfer Mode) over SONET. In this type of implementation, however, the data packets must be fully buffered at the network nodes before the node can determine whether to drop the ATM information to a local node, or to forward this information on to another network node. This buffering stage in the forwarding mechanism of ATM over SONET is slow, and thus increases the latency through each network node of the ring. This structure is generally known as a store-and-forward approach, and is also typically employed in many types of packet router products. These router products also suffer from high-latency when used in the downstream data path of a ring network.

SUMMARY OF THE INVENTION

A system and method for transporting data packets in a ring network includes a plurality of network nodes having a protection switching agent and at least one fast downstream path circuit that provides a low-latency packet cut-through function for forwarding packets from an upstream node to a downstream node. The network nodes include three interfaces, two interfaces for coupling the network node to other network nodes in the ring network, and a third interface for coupling the network node to a local node. A plurality of virtual paths are provided between a data packet gateway, such as an Internet gateway, and the local nodes that are coupled to the network nodes of the ring network. A virtual channel identifier is embedded within data packets transported on the network so that the protection switching agent in each network node can determine whether to route received data packets to the local node, or to the low-latency cut-through downstream path circuit.

According to one aspect of the invention, a SONET ring network is provided for transporting Internet data packets between an Internet gateway and a plurality of add/drop multiplexer nodes organized in a ring topology. The ring network includes: (A) a plurality of local nodes coupled to the add/drop multiplexer nodes, wherein the ring network is provisioned such that a virtual channel is formed between each local node and the Internet gateway through the plurality of add/drop multiplexer nodes; (B) a plurality of virtual channel identifiers embedded within the Internet data packets, each virtual channel identifier being associated with a particular virtual channel formed between a local node and the Internet gateway; and (C) wherein each add/drop multiplexer node includes: (1) east and west SONET agents for transmitting and receiving SONET data signals to and from two other add/drop multiplexer nodes; (2) east and west packet-over-SONET agents for processing the Internet data packets transported within the SONET data signals; and (3) a protection switching agent including an east-to-west fast downstream circuit, a west-to-east fast downstream circuit, and a local add/drop interface circuit, the fast downstream circuits including a copy circuit and a fast cut-through packet filter, and the local add/drop interface circuit including a drop-side packet filter. In this network, the protection switching agents are configured to route received Internet data packets to either the east-to-west fast downstream circuits or the west-to-east fast downstream circuits, and the copy circuit is operative to duplicate the received Internet data packets to the fast cut-through filter and the drop-side packet filter, which filter the Internet data packets based on the embedded virtual channel identifier.

According to another aspect of the invention, a ring network is provided that includes: (i) a plurality of network nodes coupled in a ring structure, wherein one of the network nodes is coupled to a data packet gateway, and the remaining network nodes are coupled to local nodes; (ii) a plurality of virtual channels formed between each local node and the data packet gateway through the plurality of network nodes; and (iii) a plurality of packet forwarding/dropping agents operating at the network nodes. Each of the packet forwarding/dropping agents further includes: (a) at least one fast downstream path circuit for forwarding data packets from one network node to another network node in the ring network; and (b) a local add/drop interface circuit for dropping packets to the local node coupled to the network node. In this network, the packet forwarding/dropping agents route received data packets to either the fast downstream path circuit or the local add/drop interface circuit by examining a virtual channel identifier embedded within the data packets.

Still another aspect of the invention provides a SONET Add/Drop Multiplexer (ADM) having three interfaces, an east SONET interface, a west SONET interface, and a local add/drop interface. The SONET ADM of the present invention preferably includes: (A) east and west SONET agents for sending and receiving SONET data signals to and from the ADM and two other SONET ADMs coupled to the east and west SONET interfaces; (B) east and west packet-over-SONET (POS) agents coupled, respectively, to the east and west SONET agents for transporting data packets within the SONET data signals; and (C) a protection switching agent including two fast downstream data path circuits, one fast downstream data path circuit coupling the west POS agent to the east POS agent and the other fast downstream data path circuit coupling the east POS agent to the west POS agent.

In this configuration, the protection switching agent of the SONET ADM routes received data packets to either of the two fast downstream data path circuits or the local add/drop interface by examining a virtual channel identifier embedded into the data packets.

Another aspect of the invention provides a method of transporting data packets in a ring network. The method includes the following steps: (a) forming a plurality of virtual paths between a data packet gateway node and a plurality of local nodes through a plurality of network nodes that form the ring network; (b) providing a virtual channel identifier within the data packets transported to and from the gateway node and the plurality of network nodes, wherein the virtual channel identifier identifies the particular virtual path to which the data packets are associated; and (c) filtering the data packets at the network nodes by examining the virtual channel identifiers to determine whether to drop the data packets to an associated local node or to pass the packets through to another network node.

It should be noted that these are just some of the many aspects of the present invention. Other aspects not specified will become apparent upon reading the detailed description set forth below.

The present invention overcomes the disadvantages of presently known ring-based networks that transport Internet-type data, and provides many advantages, such as: (1) optimized for ring-based access systems; (2) provides a low-latency downstream cut-through mechanism; (3) easily reconfigurable in response to partial network failures; (4) optimized for asymmetrical data flows, such as Internet-type data; and (5) makes better use of system bandwidth than point-to-point connections by providing a means for sharing downstream bandwidth between a plurality of virtual channels.

These are just a few of the many advantages of the present invention, which is described in more detail below in terms of the preferred embodiments. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the general need noted above and provides many advantages, as will become apparent from the following description when read in conjunction with the accompanying drawings, wherein.

DETAILED DESCRIPTION OF THE DRAWINGS

Figures 1, 2:
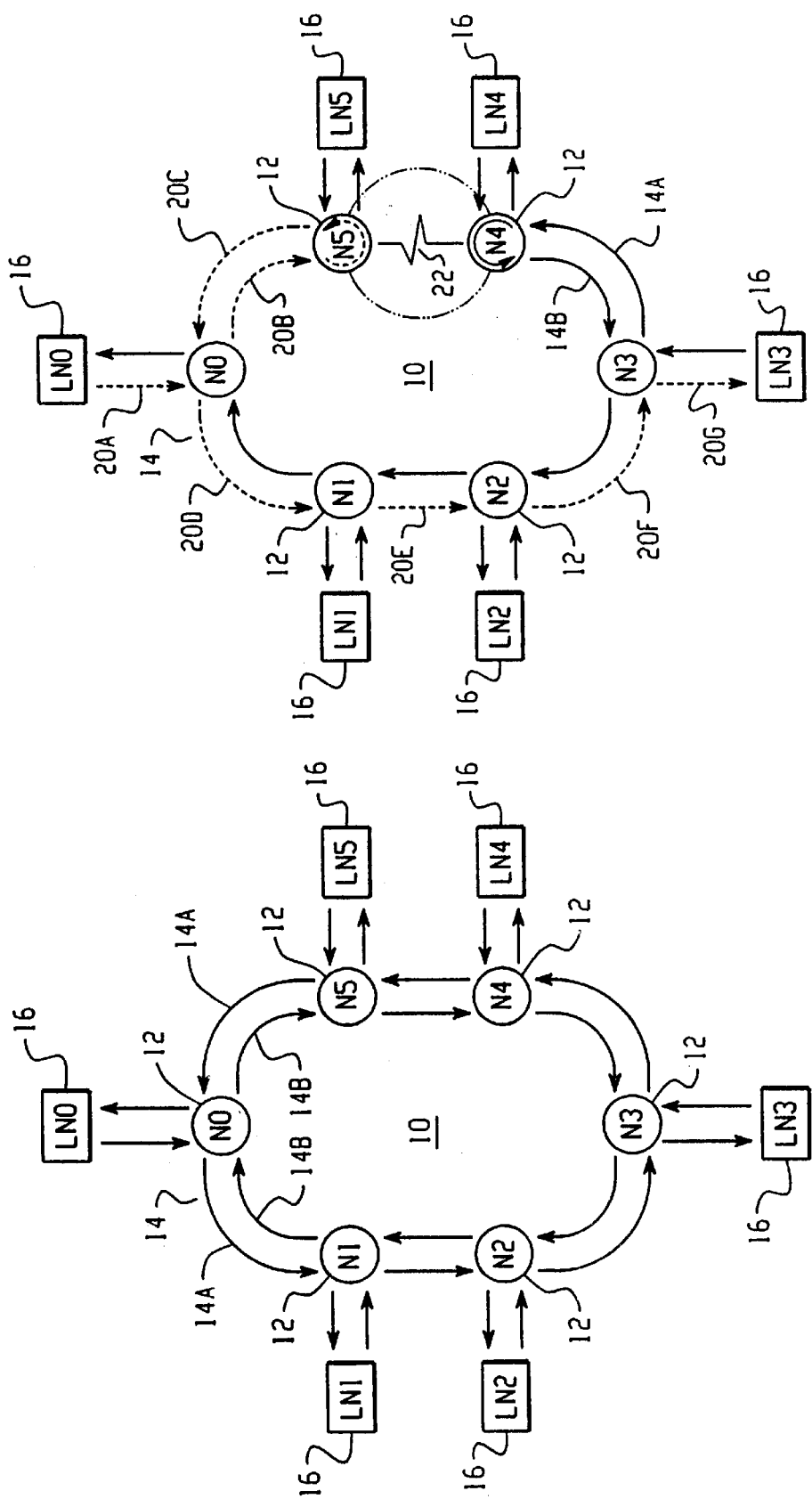
FIG. 1 is a block diagram of a ring network, such as a SONET network, which may include the system and method of the present invention.
FIG. 2 is a block diagram of the ring network shown in FIG. 1, in which a fault has occurred between two of the network nodes in the system.

Turning now to the drawing figures, FIG. 1 sets forth a system diagram of a ring network 10, such as a SONET network, which could include the functionality and network node architecture of the present invention. The ring network 10 includes a plurality of network nodes 12, labeled N0-N5, coupled in a ring structure by one or more communication paths 14A, 14B. As shown in FIG. 1, the two paths 14A, 14B transport SONET data streams (many packets/cells) in opposite directions about the ring (i.e., east and west). The communication paths 14A, 14B are preferably fiber optic connections (in SONET), but could, alternatively be electrical paths or even wireless connections (in other types of ring networks). In the case of a fiber optic connection, paths 14A, 14B could be implemented on a single fiber 14, on dual fibers 14A, 14B, or some other combination of connections.

Each network node 12 is preferably coupled to two other network nodes 12 in the ring structure 10. For example, network node N0 is coupled to network nodes N1 and N5. The coupling between the nodes in FIG. 1 is two-way, meaning that each node 12 transmits and receives data (packets/cells) to and from each of the two other nodes 12 to which it is connected. Each network node 12 includes at least two transmitter/receiver interfaces, one for each connection to another node 12. The network nodes 12 could be many types of well-known network devices, such as add-drop multiplexers ("ADMs"), switches, routers, cross-connects or other types of devices. The devices 12 shown in FIG. 1 are preferably ADMs. An ADM is a three terminal device having a local add/drop interface, an upstream network node interface, and a downstream network node interface. A more detailed block diagram of a preferred SONET ADM according to the present invention is described below in reference to FIG. 5. These ADMs 12 are coupled to local nodes 16, and are used to add packets/cells from the local nodes 16 to the SONET data stream, and conversely to drop packets from the SONET data stream to the local nodes 16.

The network nodes 12 shown in FIG. 1 may be logically connected by a plurality of virtual paths that coexist on the physical network connection(s) 14. Virtual paths are also known as logical paths or "pipes." For example, although there is only one physical connection from node N0 to node N1 to node N2, there may be numerous virtual paths between these nodes, such as one virtual path from N0 to N1, another from N0 to N2 and another from N1 to N2. Each virtual path may include a plurality of virtual channels, wherein each virtual channel transports packets (or cells) formatted according to the SONET SPE. The use of these "virtual paths" in a SONET ring network is described in more detail in commonly-assigned U.S. patent application S/N 09/324,244 ("the '244 application"). For more information on SONET formats, line-speeds, and theory of operation, see John Bellamy, *Digital Telephony*, 2d Edition (1991), pp. 403–425.

FIG. 2 sets forth a block diagram of the ring network 10 shown in FIG. 1 in which a fault 22 has occurred between two of the network nodes 12 (N5 and N4) in the system. This is an example of a situation where a path protection mechanism could be triggered in the system in order to prevent additional data packets from being transmitted towards the faulty connection 22, and thus making the system more efficient.

As shown in FIG. 2, an anomaly (or faulty condition) 22 is present in the connections between network nodes N5 and N4 of the ring network 10. This faulty condition 22 could be a line-cut (such as when a fiber optic cable is severed during a digging operation), a degradation in signal level between the nodes, or a degradation in signal quality (such as a rise in bit-error rate). In any event, the network nodes 12 may be programmed to react to many different types of anomalies. Utilizing the teaching of the '244 application, once the fault is detected, the network nodes 12 are programmed (via an included virtual path controller) to "wrap" received packets/ cells away from the anomaly 22 by sending them back towards the transmitting node where they originated and ultimately to their destination node on the other side of the fault.

Consider the example data stream flow shown in FIG. 2 (20A–20G). In this example, data packets from local node LN0 (coupled to network node N0) are destined for local node LN3 (coupled to network node N3). Initially (prior to the anomaly) node N0 transmits the packets from LN0 in a clockwise (or easterly) direction about the ring 10 towards N3. But then a fault 22 occurs between nodes N5 and N4 disabling communications along this sub-path of the ring. The system described in the '244 application detects the anomaly at nodes N5 and N4 and initiates a wrap function at these nodes so that any incoming packets that are not being dropped to the respective local connections (i.e. "through" packets) are redirected back in the opposite direction. In this manner, the packets/cells received at N5 from N0 are redirected back to N0 along path 20C, and then to N1, N2 and N3 along paths 20D, 20E and 20F, where they are dropped from the SONET ring to local node LN3 along path 20G.

FIG. 2, and its associated description, are included in the present application in order to further explain the importance of providing a network node with two fast downstream path circuits and an associated path protection switching agent. As described in more detail below, the present invention provides a network node having low-latency fast downstream path circuits in both the east-to-west and west-to-east directions about the ring network, and also provides a protection switching agent that is capable of reconfiguring the network node in response to a faulty condition.

Figure 3:
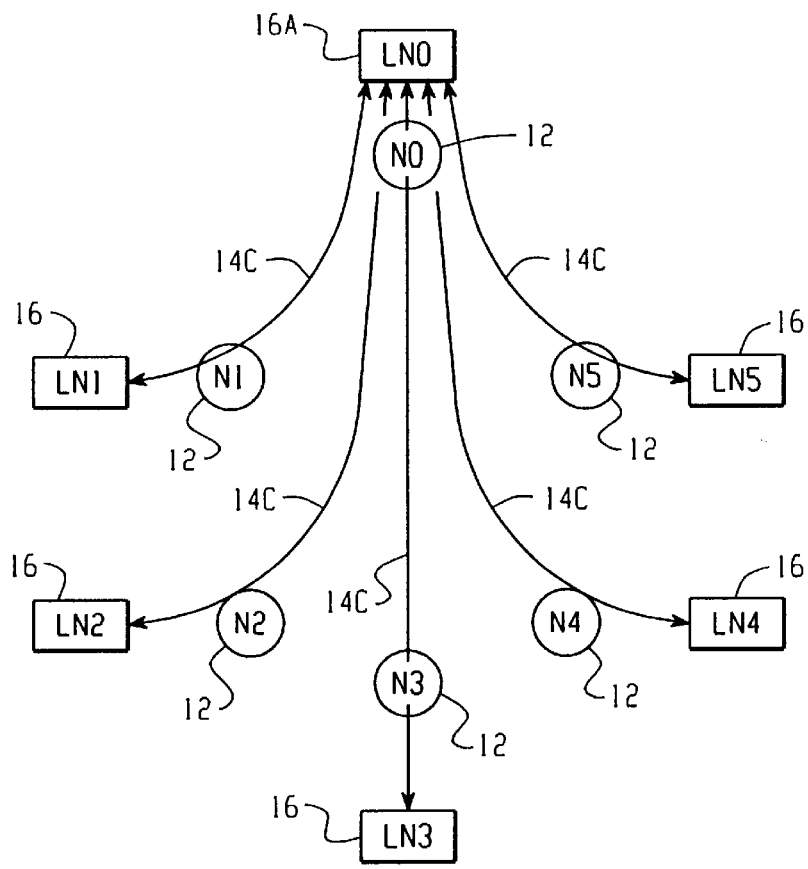
FIG. 3 is a block diagram of the ring network shown in FIG. 1, in which a plurality of virtual paths are shown between a plurality of local nodes and a single gateway node.

FIG. 3 is a block diagram of the ring network shown in FIG. 1, in which a plurality of virtual paths 14C are shown between a plurality of local nodes 16 (LN1–LN5) and a single data packet gateway node 16A (LN0). This diagram is particularly applicable to an Internet gateway application, where the ring network (and its associated network nodes 12) are connected to a common entry/exit point in the ring, in this case LN0 16A. Thus, LN0 could be an Internet gateway that couples the ring network to an external WAN, such as the Internet, via some type of high-speed packet data connection.

In this example configuration, there are six virtual paths 14C, each forming a logical connection between one of the local nodes 16 and the Internet gateway node 16A. These logical connections are established through the network nodes 12 that form the ring network. In this type of application, i.e., Internet access, there is very little node-to-node communication. Almost all of the data on the ring network is being transported within the virtual paths 14C between the local nodes 16 and the common exit/entry point 16A.

Also characteristic of this type of application is the concept of asymmetrical data flow. Internet data is typically viewed as high-bandwidth downstream and relatively low-bandwidth upstream. For the most typical Internet application, web browsing, the user (or users) at the local nodes 16 are typically downloading a tremendous amount of data (including text, graphics, sound, animations, movies, etc.) from the Internet gateway node 16A, but are only uploading a small amount of data——typically requests for more information. Although a virtual path may be created between the gateway node 16A and the local nodes 16, in reality the data packets must pass through one or more intermediary network nodes 12, each of which must determine whether to pass along the data packets or drop them to the associated local node 16. Thus, it is important to minimize the time delay (or latency) associated with transporting data through the network nodes 12. This is particular true for local node connections that are several network nodes away from the gateway node 16A, as the latency through each network node accumulates, thus further degrading the performance of the network.

FIG. 3 also shows how the ring network can be optimized by minimizing the latency of the virtual paths 14C—i.e. the number of network nodes that a particular data packet must pass through in order to get to its destination local node 16. In the example network shown in FIG. 3, the virtual paths 14C are minimized by configuring the ring in two halves, with data packets flowing in one direction to network nodes N1 and N2, and in the other direction to network nodes N4 and N5. Note that since network node N3 is equidistant (in terms of number of nodes away from the packet source 16A), it can be configured to be on either side of the ring. Distributing the network nodes 12 in this manner also optimizes the available bandwidth of the ring network. These virtual path connections are established through a process known in the SONET field as "provisioning."

Figure 4:
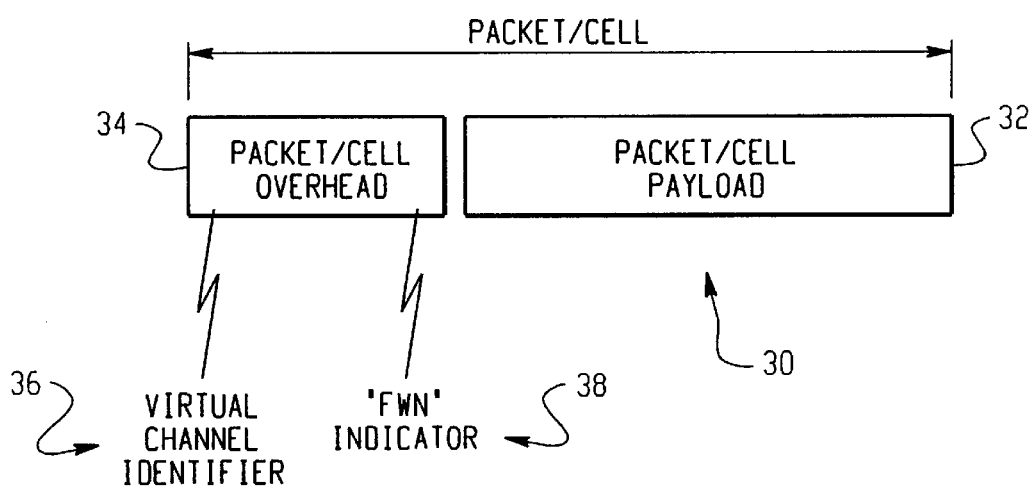
FIG. 4 is a preferred packet/cell map according to the present invention including an overhead section and a payload section.

FIG. 4 is a preferred packet/cell map 30 according to the present invention including a payload section 32 and an overhead section 34, in which special signaling identifiers (or indicators) 36, 38 are embedded into the overhead section 34 of the packet. One of these indicators is a virtual channel identifier ("VCI") 36, which identifies the particular virtual path 14C, and virtual channel within the virtual path, that the data packet is associated with. This virtual channel identifier is embedded into each data packet at the transmitter network node, which in the exemplary system shown in FIG. 3 is network node N0 12 for all downstream data packets flowing from the gateway data packet gateway 16A to the plurality of local nodes 16. Upstream data packets may be transmitted onto the network by any of the network nodes 12. As described in more detail below, the present invention uses this information to determine whether to route the data packets to an associated local node 16, or to another network node. The VCI 36 is preferably a multi-bit signal that identifies the transmitter node that launched the packet onto the ring network 10 as well as the particular virtual channel that the packet is associated with. This latter identification is necessary since a transmitter for a particular network node 12, such as node N0, could have multiple virtual channels associated with it, and each of these virtual channels may need to be individually identified by the network nodes 12.

The packet/cell may be formatted according to the SONET SPE structure, in the case of a SONET ring network, or it may be formatted according to another framing structure having payload and overhead sections in the case of other types of ring networks. The payload contains the useful information being transported on the network, and the overhead typically includes operations and maintenance information that is used by the network to facilitate packet transport.

Figure 5:
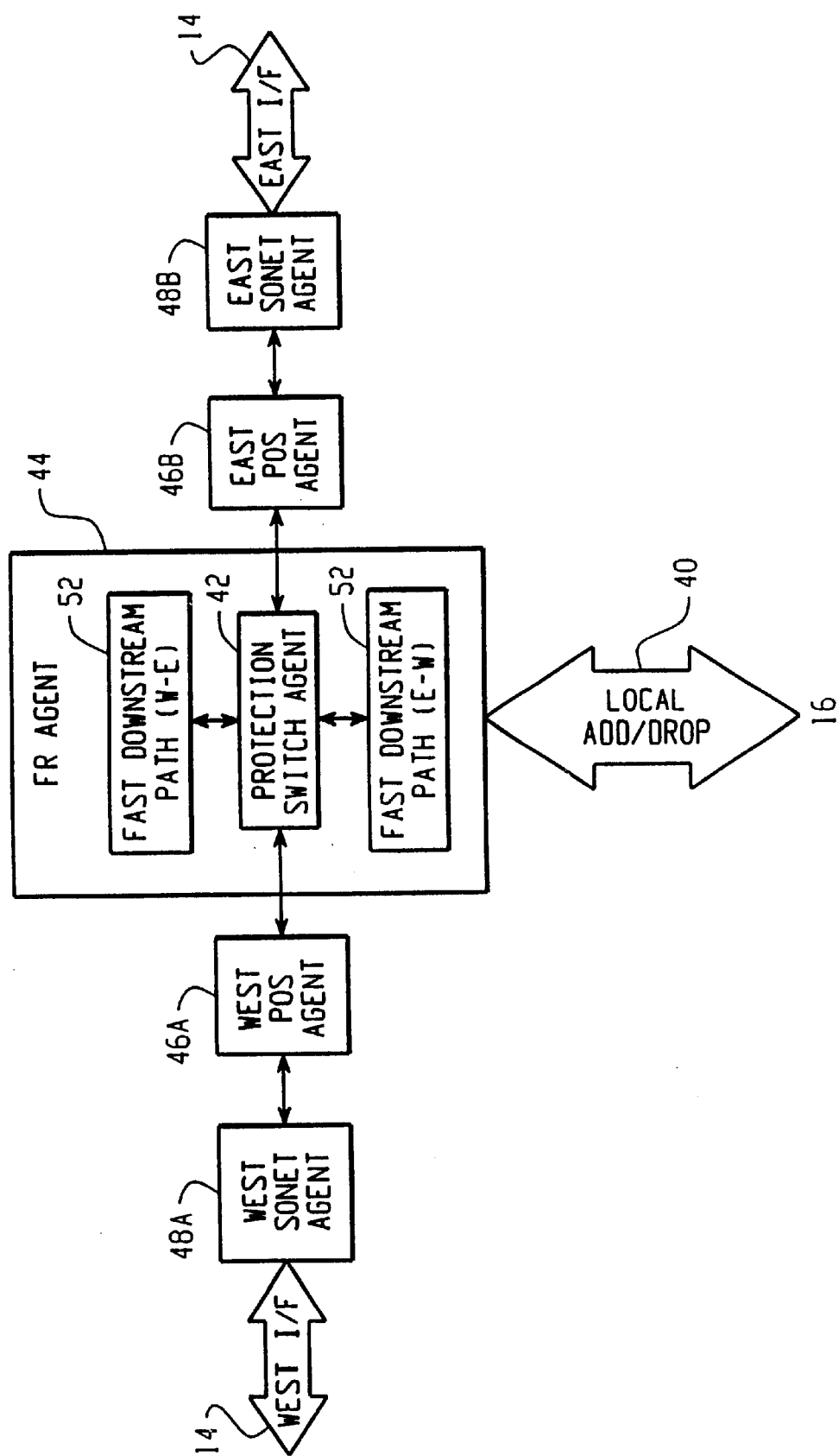
FIG. 5 is a block diagram showing several elements of a preferred SONET add-drop multiplexer network node incorporating several system elements of the present invention for facilitating asymmetrical packet forwarding.

FIG. 5 is a block diagram showing several elements of a preferred SONET add-drop multiplexer ("ADM") network node according to the present invention. The preferred ADM is a three-interface device. Two of the interfaces, the upstream and downstream network node interfaces 14 are for transporting SONET data signals to two other network nodes, one node that is upstream from the particular ADM, and another node that is downstream from the ADM. The upstream and downstream network node interfaces 14 are also termed the east and west interfaces, depending on the positioning of the particular node on the ring network. The third interface is the local add/drop interface 40, which couples the network node 12 to the corresponding local node 16.

The east and west interfaces 14 are coupled to corresponding transmitter/receiver ("T/R") interface circuits 48A, 48B in the ADM—an east SONET T/R agent 48B, and a west SONET T/R agent 48A. The two interfaces 14 correspond to the two senses of direction around the ring network. The two SONET T/R agents 48A, 48B are coupled between the interface connections 14 and corresponding east and west Packet-Over SONET ("POS") agents 46A, 48B. The POS agents are, in turn, coupled to a frame relay ("FR") agent 44, which is also coupled to the local node 16 via a local node interface 40.

Consider, for example, network node Ni shown in FIG. 3. This node is downstream from network node N0 and upstream from network node N2, in terms of transporting the Internet gateway 16A data packets around the ring network. Thus, one of the SONET T/R agents 48A, 48B is coupled to the upstream node N0, and therefore is termed the upstream network node interface, and the other SONET T/R agent is coupled to the downstream node N2, and therefore is termed the downstream network node interface.

The east and west SONET T/R agents 48A, 48B provide the SONET layer interfacing to the ring network 10 for processing the SONET data signals, and also interface the SONET protocol to the POS protocol. The corresponding POS agents 46A, 46B send and receive packets from the FR agent 44, and couple them to the SONET agents 48A, 48B. These POS agents 46A, 46B utilize standard POS protocol definitions for framing packets into the SONET SPE. The FR agent 44, which is also referred to in this application as the "packet forwarding/dropping agent" is a higher-level agent that manages point-to-point communications over the network 10, setting up and tearing down the numerous virtual channels that can be created within the SONET data stream and adding/dropping packets to and from the local node connection 40. The packet forwarding/dropping agent 44 preferably includes a protection switch agent 42 and a pair of fast downstream path circuits 52, one fast downstream path circuit for forwarding packets in the west-to-east direction and a second fast downstream path circuit for forwarding packets in the east-to-west direction.

Figure 6:
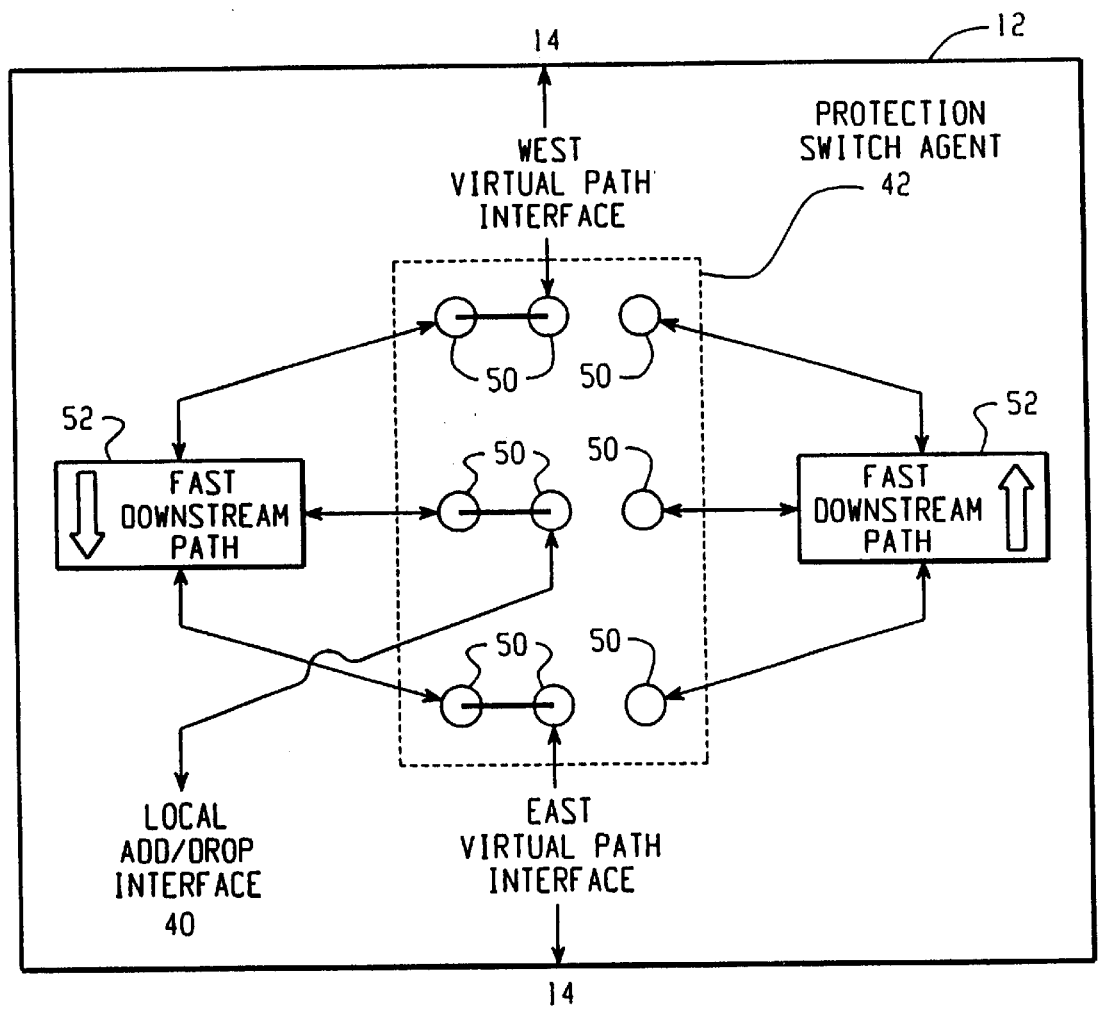
FIG. 6 is a basic block diagram of a network node having a protection switching agent and one or more fast downstream path circuits for quickly forwarding packets through the node, in which the node is configured for fast packet forwarding in the west-to-east direction on the ring network.

FIG. 6 is a basic block diagram of a network node 12 showing the functionality provided by the packet forwarding/dropping agent 44 of the present invention. The packet forwarding/dropping agent 44 includes a protection switching agent 42, which is coupled to the three interfaces of the network node 12—the east and west interfaces 14, which are also known as the upstream and downstream network node interfaces, and the local add/drop interface 40. Internal to the packet forwarding/dropping agent 44, the protection switching agent 42 is further coupled to the two fast downstream path circuits 52, one of which (as shown on the left hand side of FIG. 6) is for performing a low-latency pass-through in the west-to-east direction, and a second of which (as shown on the right hand side of FIG. 6) is for performing a low-latency pass-through in the east-to-west direction.

Internal to the protection switching agent 42 are a plurality of switch nodes 50 for configuring and reconfiguring the routing of data packets through the network node interfaces. In the configuration shown in FIG. 6, the west virtual path interface 14 is the upstream network node interface, and the east virtual path interface 14 is the downstream network node interface. Referring again to the example of network node N1 in FIG. 3, the upstream network node interface is coupled to upstream network node N0, and the downstream network node interface is coupled to the downstream network node N2. Internally to the protection switching agent 42, the switch nodes 50 are configured such that downstream data packets from the upstream network node N0 are received at the west virtual path interface 14 and routed to the west-to-east fast downstream path circuit 52 (on the left side of FIG. 6) for processing. As described in more detail below, the fast downstream path circuit 52 utilizes the embedded virtual channel identifier 36 in the data packets to determine whether to drop the packets to the local add/drop interface 40, or to perform a low-latency cut-through to the east virtual path interface 14, and thus onto the downstream network node N2.

In this configuration, the east-to-west fast downstream path 52 (on the right side of FIG. 6) is not utilized. However, if a fiber-cut were to occur somewhere on the ring network 10, then the protection switching agent may reconfigure the network node 12 by re-routing the switch nodes 50 of the protection switching agent 42 such that the east and west interfaces 14 are coupled to the east-to-west fast downstream path circuit 52 (on the right side of FIG. 6) instead of the west-to-east circuit.

Figure 7:
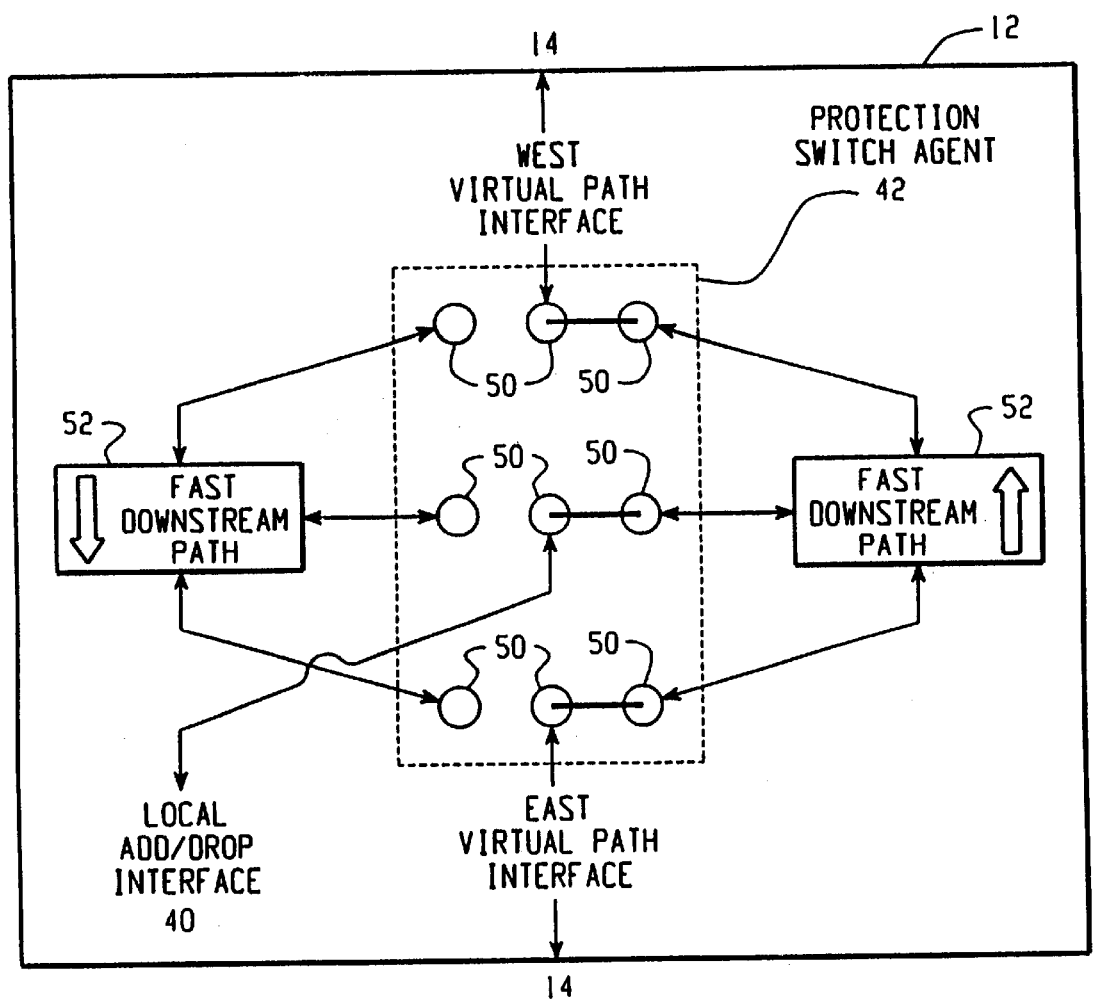
FIG. 7 is a basic block diagram of a network node having a protection switching agent and one or more fast downstream path circuits for quickly forwarding packets through the node, in which the node is configured for fast packet forwarding in the east-to-west direction on the ring network

FIG. 7 is a basic block diagram of a network node 12 having a protection switching agent and one or more fast downstream path circuits for quickly forwarding packets through the node, in which the node is configured for fast packet forwarding in the east-to-west direction on the ring network. The configuration shown in FIG. 7 may be the standard configuration for nodes on the other side of the ring than the nodes configured as shown in FIG. 6. Thus, for example, network node N4 in FIG. 3 may be configured as shown in FIG. 7 if network nodes N1, N2 are configured as shown in FIG. 6, as these nodes are on opposite sides of the ring.

Figure 8:
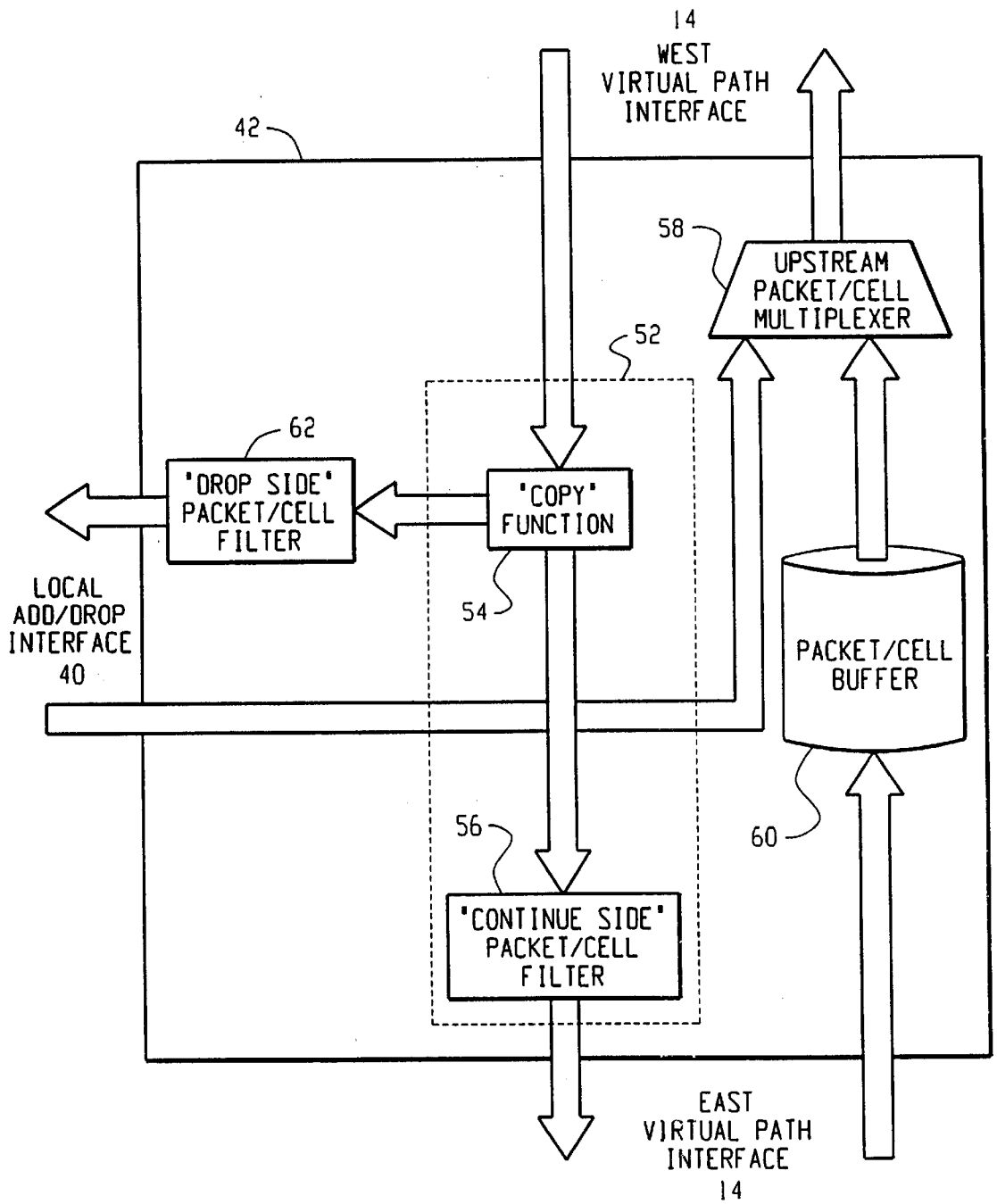
FIG. 8 is a more detailed block diagram of the network node shown in FIG. 6.

FIG. 8 is a more detailed block diagram of the network node 12 shown in FIG. 6. Here, the protection switching agent 42 of the packet forwarding/dropping agent 44 is shown coupled to the three interfaces of the network node 12—the east and west virtual path interfaces 14, and the local add/drop interface 40. Included in the protection switch agent 42 is the fast downstream path circuit 52, which is configured to perform a low-latency cut-through in the west-to-east direction. The fast downstream path circuit 52 includes a copy circuit 54 and a "continue-side" packet/cell filter 56, which is also referred to herein as the fast cut-through packet filter. The network node 12 shown in FIG. 6 also includes a drop-side packet/cell filter 62 and an upstream packet multiplexing circuit comprising packet/cell buffer 60 and upstream packet multiplexer 58.

The protection switching agent 42 shown in FIG. 8 is provisioned to operate as follows. Data packets are received at the west virtual path interface 14 from an upstream node, such as packets from node N0 being received at node N1 as shown in FIG. 3. These data packets, which in the preferred SONET implementation are encapsulated within the SONET SPE, are routed to the copy circuit 54 of the west-to-east fast downstream path circuit 52. The copy circuit 54 duplicates the received data packets and routes them to the drop-side packet filter 62 and to the continue-side packet filter 56. These packet filters 56, 62 operate in a similar manner. Each filter examines the overhead 34 of the packet/cell to extract the embedded virtual channel identifier 36, which identifies the particular virtual channel 14C to which the packets belong. A look-up table may be included with the filters to store information regarding which virtual channels are associated with this particular network node. If the virtual channel identifier 36 is associated with a virtual channel 14C provisioned to the local node 16 associated with this particular network node 12, then the drop-side filter 62 will pass these packets onto the local add/drop interface 40, and then onto the local node 16. Other packets not associated with a virtual channel established to the relevant local node 16 are removed from the data stream to the local add/drop interface 40 by the drop-side packet filter 62. In a similar, but opposite manner, the continue-side packet filter 56 examines the virtual channel identifier 36 embedded within the data packets and only routes those packets onto the east virtual path interface 14 that are associated with virtual channels terminating at other network nodes.

Because the filtering decision (either drop-side or continue-side) is based upon the first few bytes of the received packet, the decision can be made before the network node 12 has even received the entire data packet. Thus, the node 12 doesn't need to wait until the entire packet is received, as in the prior art ATM over SONET technique or the router applications, but can immediately start forwarding data onto the downstream node, or to the local node 16. In this manner, the present invention truly minimizes the downstream latency of the network nodes 12.

By providing the virtual channel identifier 36 in the data packets, and by providing a very fast lookup mechanism at the continue-side packet/cell filter 56 for determining whether to cut-through the received data packets, the present invention provides a network node 12 having very low downstream latency. Instead of buffering the entire data packet and then determining how to route it, as in the prior art techniques, the present invention provides a structure that minimizes the downstream latency through each intermediary network node by only examining the first few bytes of the incoming data packets.

On the upstream data path (from east to west for the node in FIG. 8), data packets are received at the east virtual path interface 14 from a coupled downstream network node (such as node N2 to node N1 in FIG. 3). These packets are buffered (or stored) at the network node 12 by packet/cell buffer 60. The packet/cell buffer 60 is, in turn, coupled to one input of the upstream packet multiplexer 58. The other input to the upstream packet multiplexer 58 is coupled to the "add" side of the local add/drop interface 40 for receiving upstream data packets from the attached local node 16. These upstream data packets may be, for example, requests to the Internet gateway 16A for additional information, such as web-page information, or other types of data packets. The upstream packet multiplexer 58 merges the upstream data packets received from the downstream network node via the east virtual path interface 14 with the data packets received from the attached local node, and forwards these packets onto the upstream network node via the west virtual path interface 14. It is important to note that the configuration of the upstream side of the protection switching agent 42 does not provide the same type of low-latency cut-through as the downstream side, due to the buffering and multiplexing operations, which are time consuming. This is, however, acceptable for the preferred application of the present invention—i.e., Internet data transport over a SONET ring network—because of the asymmetrical nature of Internet-type data, and because of the fact that the upstream bandwidth is so much lower than the downstream bandwidth.

Figure 9:
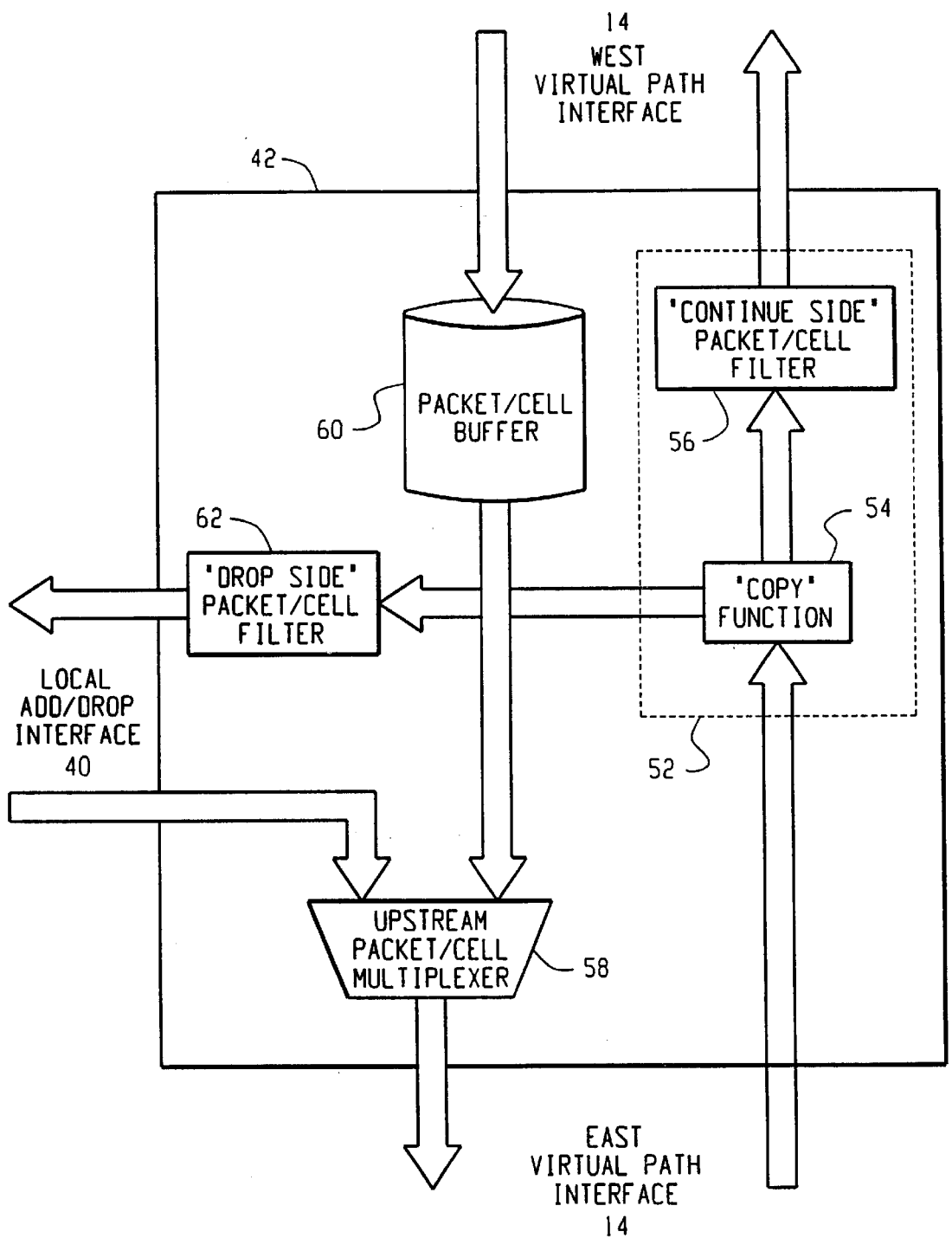
FIG. 9 is a more detailed block diagram of the network node shown in FIG. 7.

FIG. 9 is a more detailed block diagram of the network node shown in FIG. 7. It includes the same elements as FIG. 8, except that the fast downstream path circuit 52 and the upstream packet multiplexing circuit 58 are configured to operate in the opposite sense of direction about the ring than that shown in FIG. 8.

Figure 10:
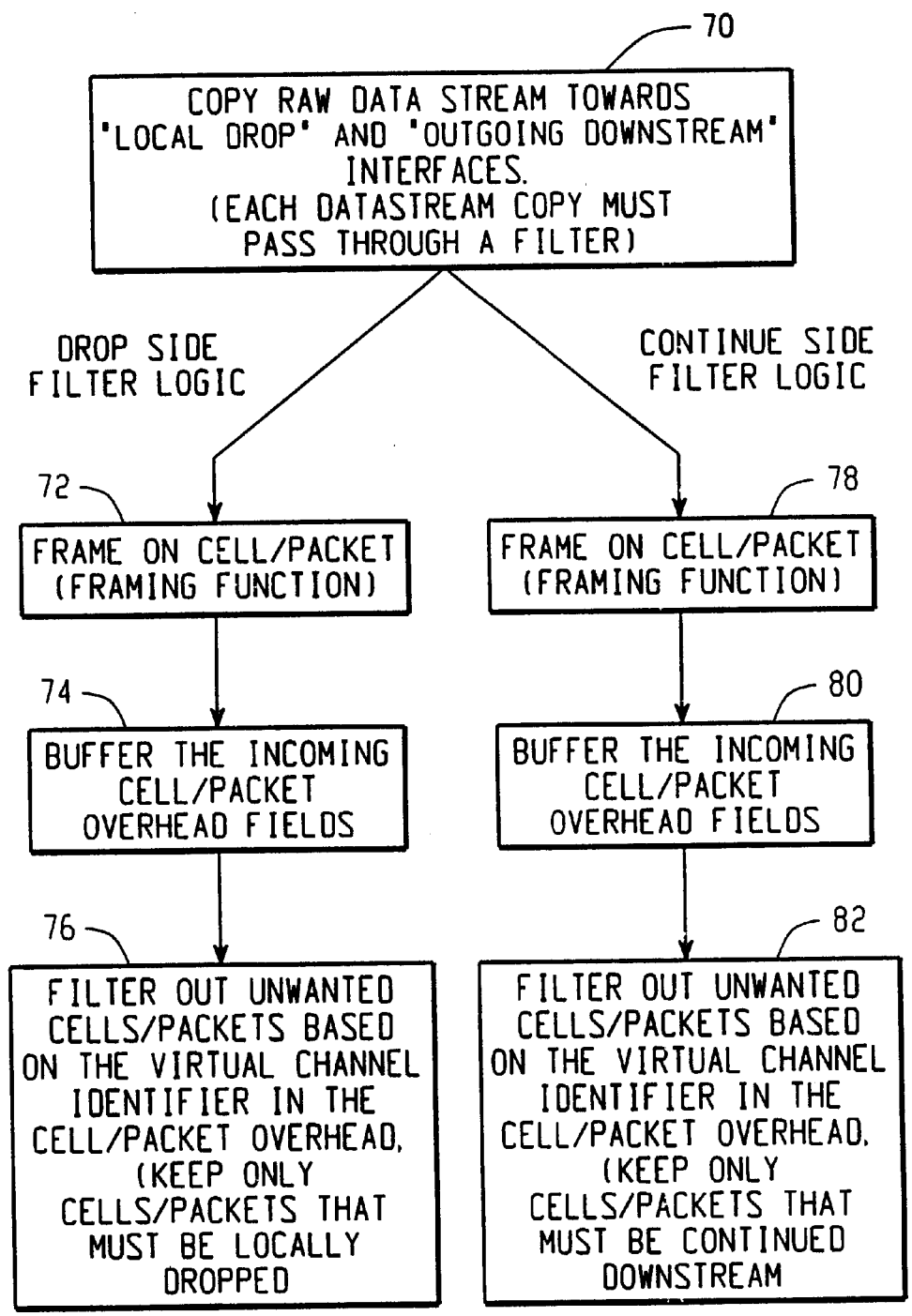
FIG. 10 is a flowchart showing the method steps carried out by the network node shown in FIGS. 6–9 in the downstream data path.

FIG. 10 is a flowchart showing the method steps carried out by the preferred network node 12 shown in FIGS. 6–9 in forwarding data packets along the downstream data path through the drop-side logic and the continue-side logic. Initially, at step 70, the node 12 copies the raw packet data stream towards the local add/drop interface 40 and the downstream network node interface 14 using the copy function circuit 54 of the fast downstream path circuit 52. This copying operation splits the method into two parts, a drop-side filter logic part (shown on the left side of FIG. 10) and a continue-side filter logic part (shown on the right side of FIG. 10).

Turning first to the drop-side filter logic steps, at step 72, the raw data stream is framed in order to demarcate the boundaries of the individual cells/packets to be filtered. Having framed the data packets, the overhead fields 34 in the packets/cells are then buffered (or stored) at step 74 in order to extract the virtual channel identifier 36. Finally, at step 76, the drop-side packet filter 62 compares the extracted virtual channel identifier information 36 with those stored in an associated look-up table at the network node. If there is a match (indicating that the virtual channel identifier 36 is associated with a virtual channel terminating at the local node connected to this particular network node), then the filter allows the data packet(s) to continue through to the local add/drop interface 40. If, however, the virtual channel identifier 36 does not match those stored at the network node, then those packets are simply deleted from the raw data stream.

The operation on the continue-side part is similar. At step 78, the raw data stream is framed in order to demarcate the boundaries of the individual cells/packets to be filtered. Having framed the data packets, the overhead fields 34 in the packets/cells are then buffered (or stored) at step 80 in order to extract the virtual channel identifier 36. Finally, at step 82, the continue-side packet filter (also known as the fast cut-through packet filter) compares the extracted virtual channel identifier information 36 with those stored in an associated look-up table at the network node, and if there is not a match (indicating that the virtual channel identifier 36 is not associated with a virtual channel terminating at the local node connected to this particular network node), then the filter allows the data packet(s) to continue through to the downstream network node interface. If, however, the virtual channel identifier 36 does match those stored at the network node, then those packets are simply deleted from the raw data stream and not passed through to the downstream network node.

Figure 11:
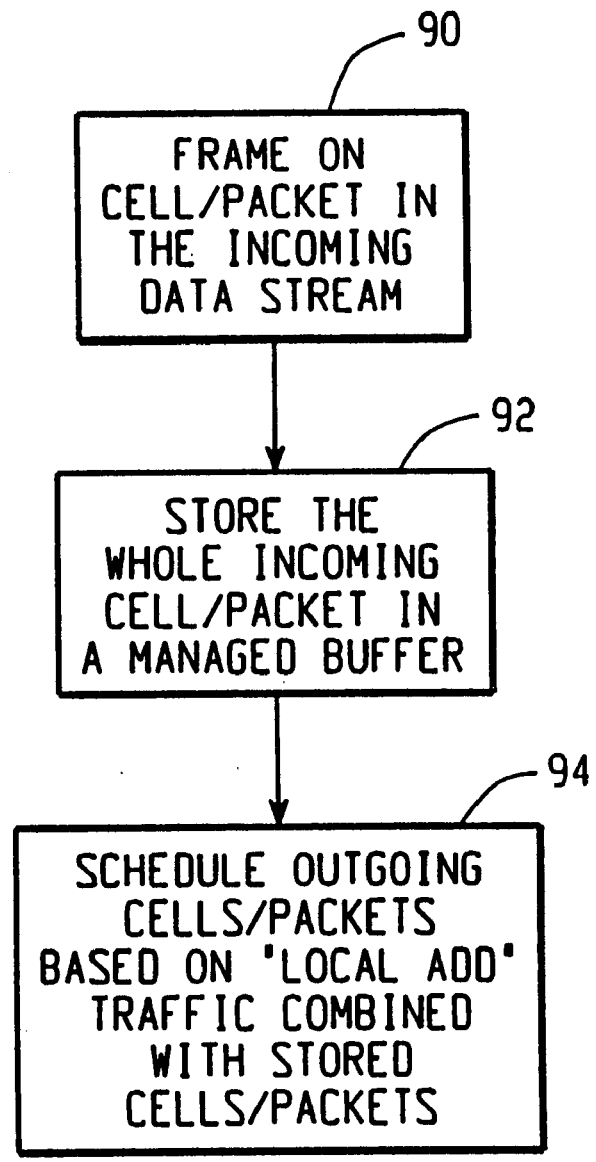
FIG. 11 is a flowchart showing the method steps carried out by the network node shown in FIGS. 6–9 in the upstream data path.

Finally, FIG. 11 is a flowchart showing the method steps carried out by the network node shown in FIGS. 6–9 in the upstream data path. Similar to steps 72 and 78 in FIG. 10, the first step (step 90) of the upstream method is to frame the raw data stream from the downstream network node interface. This framed data stream is then temporarily buffered (or stored) at step 92 until the entire data packet has been received. Finally, at step 94, the system schedules outgoing packets to the upstream network node interface by controlling the upstream packet multiplexer 58, which is coupled to the output of the buffer and to the add data stream from the local add/drop interface 40.

The preferred embodiments of the invention described with reference to the drawing Figures are presented only as examples of the present invention, which is limited only by the claims. Other elements, steps, methods and techniques that are insubstantially different from those described herein are also within the scope of the invention.

What is claimed is:

1. A SONET Add/Drop Multiplexer (ADM) for processing data packets having an overhead section and a payload section, the SONET ADM having three interfaces, an east SONET interface, a west SONET interface, and a local add/drop interface, comprising:

east and west SONET agents for sending and receiving SONET data signals to and from the ADM and two other SONET ADMs coupled to the east and west SONET interfaces.

east and west packet-over-SONET (POS) agents coupled, respectively, to the east and west SONET agents for transporting data packets within the SONET data signals; and a protection switching agent including two fast downstream data path circuits, one fast downstream data path circuit coupling the west POS agent to the east POS agent and the other fast downstream data path circuit coupling the east POS agent to the west POS agent;

wherein the protection switching agent receives and buffers only a portion of the data packets including at least a portion of the overhead section and routes this portion to the fast downstream data path circuits which examine an embedded virtual channel identifier within the portion and determines by comparing the virtual channel identifier within the overhead section to a stored look-up table of virtual channel identifiers associated with the SONET ADM, whether to forward the entire data packet to another SONET ADM via one of the east or west SONET interfaces, or to forward the entire data packet to a local node coupled to the SONET ADM via the local add/drop interface;

wherein the protection switching agent further includes a packet buffer coupled to one of the SONET interfaces, and a packet multiplexer coupled to the output of the packet buffer and the local add/drop interface for multiplexing onto a second SONET interface the data packet received from the one SONET interface and the local add/drop interface.

2. The SONET ADM of claim 1, wherein the portion of the data packets is the overhead section of the data packets.

3. The SONET ADM of claim 2, wherein the fast downstream data path circuits comprises:
a copy circuit that duplicates the overhead section of the data packets; and
a plurality of packet filters that receive the overhead section of the data packets from the copy circuit and compare the virtual channel identifier to the stored look-up table to forward the entire data packet via the east or west SONET interfaces or the local add/drop interface.

4. The SONET ADM of claim 1, wherein the fast downstream path circuits route packets from a downstream node to an upstream node in the event of a network failure.

5. A method of transporting data packets having an overhead section and a payload section in a ring network, comprising the steps of:
forming a plurality of virtual paths between a data packet gateway node and a plurality of local nodes through a plurality of network nodes that form the ring network;
providing a virtual channel identifier within the overhead section of the data packets transported to and from the gateway node and the plurality of network nodes, wherein the virtual channel identifier identifies the particular virtual path to which the data packets are associated; and
filtering the data packets at the network nodes by receiving and buffering only a portion of the data packets including at least a portion of the overhead section that includes the virtual channel identifier, and by duplicating the overhead section and comparing the virtual channel identifier from the duplicated overhead section with a stored look-up table of virtual channel identifiers to determine whether to drop the entire data packets to an associated local node or to forward the entire data packets through to another network node, wherein the filtering step is executed without having to first receive and buffer the entire data packet including the overhead section and the payload section.

6. A SONET Add/Drop Multiplexer (ADM) for processing data packets having an overhead section and a payload section, the SONET ADM having three interfaces, an east SONET interface, a west SONET interface, and a local add/drop interface, comprising:
east and west SONET agents for sending and receiving SONET data signals to and from the ADM and two other SONET ADMs coupled to the east and west SONET interfaces;
east and west packet-over-SONET (POS) agents coupled, respectively, to the east and west SONET agents for transporting data packets within the SONET data signals; and
a protection switching agent including two fast downstream data path circuits, one fast downstream data path circuit coupling the west POS agent to the east POS agent and the other fast downstream data path circuit coupling the east POS agent to the west POS agent;
wherein the protection switching agent receives and buffers only a portion of the data packets including at least a portion of the overhead section and routes this portion to the fast downstream data path circuits which examine an embedded virtual channel identifier within the portion and determines, by comparing the virtual channel identifier within the overhead section to a stored look-up table of virtual channel identifiers associated with the SONET ADM, whether to forward the entire data packet to another SONET ADM via one of the east or west SONET interfaces, or to forward the entire data packet to a local node coupled to the SONET ADM via the local add/drop interface:
wherein the portion of the data packets is the overhead section of the data packets;
wherein the fast downstream data path circuits comprises:
a copy circuit that duplicates the overhead section of the data packets; and
a plurality of packet filters that receive the overhead section of the data packets from the copy circuit and compare the virtual channel identifier to the stored look-up table to forward the entire data packet via the east or west SONET interfaces or the local add/drop interface.

7. The SONET ADM of claim 6, wherein the protection switching agent further includes a packet buffer coupled to one of the SONET interfaces, and a packet multiplexer coupled to the output of the packet buffer and the local add/drop interface for multiplexing onto a second SONET interface the data packet received from the one SONET interface and the local add/drop interface.

8. The SONET ADM of claim 6, wherein the fast downstream path circuits route packets from a downstream node to an upstream node in the event of a network failure.

9. A ring network for transporting data packets between a data packet gateway and a plurality of network nodes organized in a ring topology, comprising:
a plurality of local nodes coupled to the network nodes, wherein the ring network is provisioned such that a plurality of virtual channels are formed between the data packet gateway and the local nodes through the plurality of network nodes, wherein the data packets include an overhead section and a payload section, and wherein a virtual channel identifier is embedded within the overhead section of each data packet and identifies a particular virtual channel of the plurality of virtual channels formed between the data packet gateway and the local nodes;
wherein each network node includes a packet forwarding/dropping agent including:
at least one fast downstream path circuit for receiving and buffering only the a portion of each data packet including at least a portion of the overhead section that includes the virtual channel identifier and for determining, based on the virtual channel identifier embedded, whether to forward the data packet to another network node in the ring network; and
a local add/drop interface circuit for dropping packets to the local node coupled to the network node;
wherein the fast downstream path circuit in the packet forwarding/dropping agent includes a copy circuit and a fast cut-through packet filter, and the local add/drop interface circuit in the packet forwarding/dropping agent includes a drop-side packet filter and wherein the copy circuit buffers the portion of the data packets from the data packet gateway and copies only the portion to both the fast cut-through packet filter and the drop-side packet filter, wherein the fast cut-through packet filter examines the virtual channel identifier and determines whether to forward the data packet to another network node in the ring network, and the drop-side packet filter examines the same virtual channel identifier that was examined by the fast cut-through packet filter and determines whether to forward the data packet to the local node;

wherein each network node has three interfaces, one interface couples the network node to an associated local node, and the other two interfaces couple the network node to an upstream network node and a downstream network node, wherein the upstream network node is closer to the data packet gateway than the network node and the downstream network node is further away from the data packet gateway;

wherein the fast downstream path circuit routes packets from the upstream network node interface to the downstream network node interface;

wherein the local add/drop interface routes packets associated with the virtual channel between the associated local node and the data packet gateway from the upstream network node to the local node interface;

wherein the packet forwarding/dropping agents further include:
  an upstream packet multiplexing circuit coupled between the downstream network node interface and the upstream network node interface;
  wherein the upstream packet multiplexing circuit includes a packet buffer coupled to the downstream network node interface for receiving upstream data packets from the network node coupled to the downstream network node interface, and an upstream packet multiplexer coupled to the output of the packet buffer and the local add/drop interface circuit for multiplexing the data packets from the network node coupled to the downstream node interface with data packets from the local node.

10. The ring network of claim 9, wherein the ring network is a SONET ring.

11. The ring network of claim 9, further comprising:
  at least two SONET agents operating at the network nodes for transmitting and receiving SONET data signals to and from other network nodes, wherein the SONET data signals include the data packets; and
  at least two packet-over-SONET agents operating at the network nodes for processing the data packets transported within the SONET data signals.

12. The ring network of claim 9, wherein the data packet gateway is an Internet gateway.

13. The ring network of claim 9, wherein the network nodes are add/drop multiplexers.

14. The ring network of claim 9, wherein the virtual channel identifiers are embedded into the data packets by the network node coupled to the data packet gateway.

15. The ring network of claim 9, wherein the packet forwarding/dropping agents further include:
  a packet buffer for receiving and storing data packets being transported from a local node towards the data packet gateway.

16. The ring network of claim 9, wherein the network node is switchable such that the fast downstream path circuit routes packets from the downstream network node interface to the upstream network node interface in the event of a network failure.

* * * * *

UNITED STATES PATENT AND TRADEMARK OFFICE
CERTIFICATE OF CORRECTION

PATENT NO. : 6,724,781 B1
DATED : April 20, 2004
INVENTOR(S) : Dupont

It is certified that error appears in the above-identified patent and that said Letters Patent is hereby corrected as shown below:

Column 14,
Line 49, should read -- and buffering only a portion of each data packet --

Signed and Sealed this

Thirteenth Day of July, 2004

JON W. DUDAS
*Acting Director of the United States Patent and Trademark Office*